United States Patent
Boddakayala (10) Patent No.: US 9,647,249 B2
(45) Date of Patent: May 9, 2017

(54) COOLING SYSTEM FOR VEHICLE BATTERIES

(75) Inventor: Bhaskara Boddakayala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1097 days.

(21) Appl. No.: 13/352,145

(22) Filed: Jan. 17, 2012

(65) Prior Publication Data

US 2013/0183555 A1    Jul. 18, 2013

(51) Int. Cl.
| | |
|---|---|
| *H01M 2/10* | (2006.01) |
| *H01M 10/625* | (2014.01) |
| *H01M 10/647* | (2014.01) |
| *H01M 10/6556* | (2014.01) |
| *H01M 10/613* | (2014.01) |

(52) U.S. Cl.
CPC ....... *H01M 2/1077* (2013.01); *H01M 10/613* (2015.04); *H01M 10/625* (2015.04); *H01M 10/647* (2015.04); *H01M 10/6556* (2015.04); *H01M 2220/20* (2013.01); *Y10T 29/4935* (2015.01)

(58) Field of Classification Search
CPC ... B23P 15/26; H01M 2/1077; H01M 10/625; H01M 10/6556; H01M 10/613; H01M 10/647; H01M 2220/20; Y10T 29/4935
See application file for complete search history.

(56) References Cited

U.S. PATENT DOCUMENTS

| | | | |
|---|---|---|---|
| 2006/0218965 A1* | 10/2006 | Manole | 62/513 |
| 2006/0225908 A1* | 10/2006 | Ding et al. | 174/15.6 |
| 2006/0231233 A1 | 10/2006 | Farid | |
| 2009/0142628 A1* | 6/2009 | Okada et al. | 429/8 |
| 2009/0162713 A1 | 6/2009 | Peng | |
| 2010/0304192 A1* | 12/2010 | Chan et al. | 429/50 |
| 2010/0304252 A1 | 12/2010 | Chan | |
| 2011/0132580 A1 | 6/2011 | Herrmann | |
| 2011/0222239 A1* | 9/2011 | Dede | 361/689 |

(Continued)

FOREIGN PATENT DOCUMENTS

| | | |
|---|---|---|
| EP | 2337141 | 6/2011 |
| JP | 61016482 | 1/1986 |
| JP | 1081178 | 3/1989 |

(Continued)

OTHER PUBLICATIONS

Jankowski et al., Comparing Microchannel Technologies to Minimize the Thermal Stack and Improve Thermal Performance in Hybrid Electric Vehicles, http://dx.doi.org/10.1109/VPPC.2007.4544111, published Sep. 12, 2007.

(Continued)

*Primary Examiner* — Alex Usyatinsky
(74) *Attorney, Agent, or Firm* — Carlson, Gaskey & Olds, P.C.

(57) ABSTRACT

The present disclosure relates to a cooling system for a vehicle battery, having: a cooling plate; an inlet manifold configured to supply fluid from a heat exchanger to the cooling plate; an outlet manifold configured to return fluid to the heat exchanger; and a plurality of micro-conduits formed in the cooling plate, configured to deliver fluid between the inlet manifold and outlet manifold.

18 Claims, 9 Drawing Sheets

(56) References Cited

U.S. PATENT DOCUMENTS

2011/0297470 A1* 12/2011 Heichal et al. .............. 180/68.5
2013/0034764 A1* 2/2013 Ochi et al. ..................... 429/99

FOREIGN PATENT DOCUMENTS

| WO | 2010136863 | 12/2010 |
| WO | 2010148224 | 12/2010 |
| WO | WO2010136861 | 12/2010 |

OTHER PUBLICATIONS

Anthony Jarrett, Multi-Objective Design Optimization of Electric Vehicle Battery Cooling Plates Considering Thermal and Pressure Objective Functions, http://qspace.library.queensu.ca/bitstream/1974/6706/1/Jarrett_Anthony_P_201109_MASc.pdf, published Sep. 1, 2011.

* cited by examiner

COOLING SYSTEM FOR VEHICLE BATTERIES

TECHNICAL FIELD

The present disclosure relates to cooling techniques for electric vehicle and hybrid electric vehicle batteries.

BACKGROUND

Conventional vehicles include electric powertrains to increase fuel economy and reduce unwanted gas emissions. Of the vehicles employing electric powetrains there are hybrid electric vehicles (or HEVs), plug-in hybrids (or PHEVs), all-electric vehicles or battery electric vehicles (EVs or BEVs), and fuel cells. The battery packs for these systems typically include an arrangement of 50-250 NiMH or Li-ion battery cells in a confined arrangement. The packs are designed to increase the energy density of each battery cell.

Typically heat dissipation increases with energy density. Battery packs can generate a considerable amount of heat during operation. Moreover, when the ambient temperature is relatively warm thermal control of the battery pack can be difficult. Unwanted heat dissipation can, for example, diminish the energy capacity of the battery pack and affect passenger comfort. Typical operating parameters for the battery pack are within 30 to 40 degrees Celsius. In order to mitigate this, some battery packs are equipped with a cooling system that actively circulates liquid coolant around the battery pack. For example, U.S. Patent Publication No. 2011/0132580 titled "Device for Cooling a Vehicle Battery" discloses a cooling device for a vehicle battery that has a cooling element which provides convective heat transfer from the batteries using fluid ducts. While this method of fluid transfer can be effective, there is a need for improvement with respect to the design of a cooling element in order to increase heat transfer and reduce power demands.

Other systems that actively circulate coolant through a cooling system use expensive refrigerant chillers, thermal expansion valves (or TXVs), or solenoids to cool the battery even under hot ambient conditions. These arrangements require more parts, greater power usage and are typically more expensive than the arrangements discussed herein.

Therefore, it is desirable to have a cooling system for a vehicle battery with improved heat transfer and system costs. It is also desirable to have a method of tailoring the cooling capabilities of the cooling system to meet desired performance demands.

SUMMARY

The present disclosure addresses one or more of the above-mentioned issues. Other features and/or advantages will become apparent from the description which follows.

One exemplary embodiment relates to a cooling system for a vehicle battery, comprising: a cooling plate; an inlet manifold configured to supply fluid from a heat exchanger to the cooling plate; an outlet manifold configured to return fluid to the heat exchanger; and a plurality of micro-conduits formed in the cooling plate, configured to deliver fluid between the inlet manifold and outlet manifold.

Another exemplary embodiment relates to a vehicle battery package, including: a plurality of battery cells; a cooling plate adjacent the battery cells; an inlet manifold or outlet manifold configured to extend along a center section of the cooling plate; and a plurality of micro-conduits formed in the cooling plate, configured to deliver fluid between the inlet manifold and outlet manifold.

Another exemplary embodiment relates to a method of manufacturing a cooling system for a vehicle battery, the method including: forming a cooling plate; attaching an inlet manifold to the cooling plate; attaching an outlet manifold to the cooling plate; and forming a plurality of micro-conduits configured to deliver fluid between the inlet manifold and outlet manifold in the cooling plate.

One advantage of the present disclosure is that it provides a more cost-effective cooling system for a vehicle battery. The need for the use of expensive refrigerant chillers, thermal expansion valves (or TXVs), or solenoid valves is eliminated.

Another advantage of the present disclosure is that it teaches cooling systems for vehicle batteries with improved heat transfer achieved by the placement of micro-conduits formed in a cooling plate.

Another advantage of the present disclosure is that it teaches an optimization function for the geometry of the cooling plate. Performance of the cooling systems can thereby be tailored according to cooling plate geometry.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Referring to the drawings, wherein like characters represent examples of the same or corresponding parts throughout the several views, there are shown various cooling systems for use with vehicle batteries. The illustrated cooling systems include a cooling plate configured to abut a set of batteries or battery modules so as to remove heat therefrom. The cooling plates include an inlet manifold and an outlet manifold that facilitate fluid circulation between the cooling plate and a heat exchanger. Micro-conduits are "micro" in that they are extremely small in size relative to the cooling plate. Micro-conduits also enable fluid circulation between the inlet manifold and outlet manifold (e.g., a 1:100 relationship). In some of the illustrated embodiments, coolant is introduced to an integrated coolant distributor which sends coolant to the micro conduits embedded in the cooling plate. The coolant passes through the micro-conduits and absorbs heat generated by the battery cells thus working as a heat carrier. Fluid is then passed through a heat exchanger and actively circulated during operation of the battery. Several exemplary arrangements of the manifolds and micro-conduits are illustrated and discussed hereinbelow.

Also discussed hereinbelow is a mathematical model for tailoring the performance of a cooling system according to micro-conduit geometry. In this manner, the cooling systems can be designed to emphasize or de-emphasize certain performance characteristics. As taught, the cooling systems can be tailored to maximize heat rejection, minimize pressure, and/or strike a predetermined balance between these characteristics and others.

Figure 1:
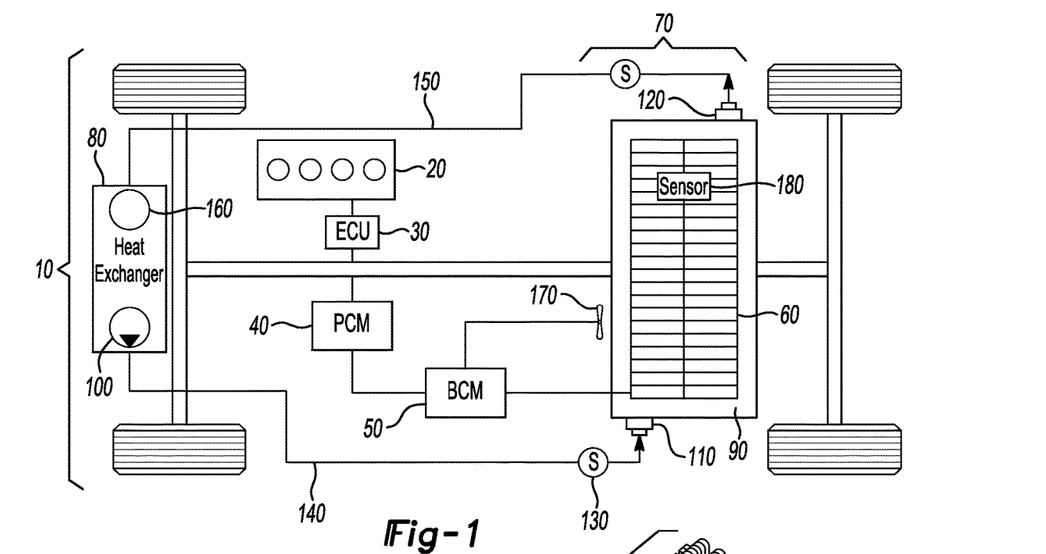
FIG. 1 is a schematic illustration of a hybrid electric vehicle (HEV) having an exemplary cooling system for the vehicle battery.

Referring now to FIG. 1, there is shown therein a schematic depiction of a hybrid electric vehicle 10. As shown, an internal combustion engine (or ICE) 20 is included in the powertrain. The ICE 20 is linked to the engine control unit (or ECU) 30. The ECU 30 is connected through a communication link to the powertrain control module (or PCM) 40. PCM 40 is also linked to a battery control module (or BCM) 50 that controls a battery pack 60. In some embodiments, the ECU 30 and/or BCM 50 are incorporated into the PCM 40. In the shown embodiment, BCM 50 includes a controller for a cooling system (or cooling apparatus) 70 configured to cool the vehicle battery pack 60. BCM 50 is also configured to control the heat exchanger 80 in communication with the cooling system 70.

With reference to FIG. 1, on the rear axle of the vehicle the battery pack 60 is positioned between the driver and passenger sides of the vehicle. A plurality of battery cells sits atop a cooling plate 90. The cooling plate 90 is in fluid communication with the heat exchanger 80 mounted on the front axle of the vehicle. The heat exchanger 80 can be, for example, a radiator. Heat exchanger 80 includes a pump 100 that feeds into an inlet nozzle 110 for cooling plate 90. Fluid exits the cooling plate through an outlet nozzle 120. Pump 100 is controlled by BCM 50 to output fluid according to programmed vehicle and/or ambient characteristics.

A sensor 130 is positioned in inlet fluid line 140, as shown in FIG. 1. Sensor 130 can be any sort of measuring device or represent a plurality of different sensors. For example, sensor 130 can be a temperature sensor, pressure sensor, flow rate or viscosity sensor. Fluid line 140 is attached to the inlet nozzle 110 which connects to an inlet manifold (e.g, 220 as discussed below with respect to FIG. 4) to line 140. Fluid is passed through cooling plate 90 of FIG. 1 and exists at an outlet manifold (e.g, 230 as discussed below with respect to FIG. 4). From the outlet manifold fluid exits the cooling plate at outlet nozzle 120 of FIG. 1 which is positioned at another end of the cooling plate 90. Outlet nozzle 120 is attached to an outlet fluid line 150. A representative sensor is shown in outlet fluid line 150 as well. Data related to any number of performance characteristics can be read from sensor. In the illustrated embodiment, fluid is collected at an outlet collector tank 160 before it enters the heat exchanger.

The cooling system 70 shown in FIG. 1 is a multifaceted cooling device. Convection cooling is also enhanced with the use of a fan 170 in communication with the battery pack. Fan 170 is mounted with respect to the pack housing (not shown), configured to provide indirect or direct cooling to the battery cells. In other embodiments, multiple fans are included in the cooling system. BCM 50 is linked to fan 170 to control fan use according to programmed vehicle and/or ambient characteristics.

As also shown in FIG. 1, a sensor 180 is in communication with the battery pack 60. Sensor 180 can be a single data sensor or any number of measuring devices related to, for example, temperature, heat dissipation, power level, or other operating parameters. Sensor 180 is linked to BCM 50.

Figure 2:
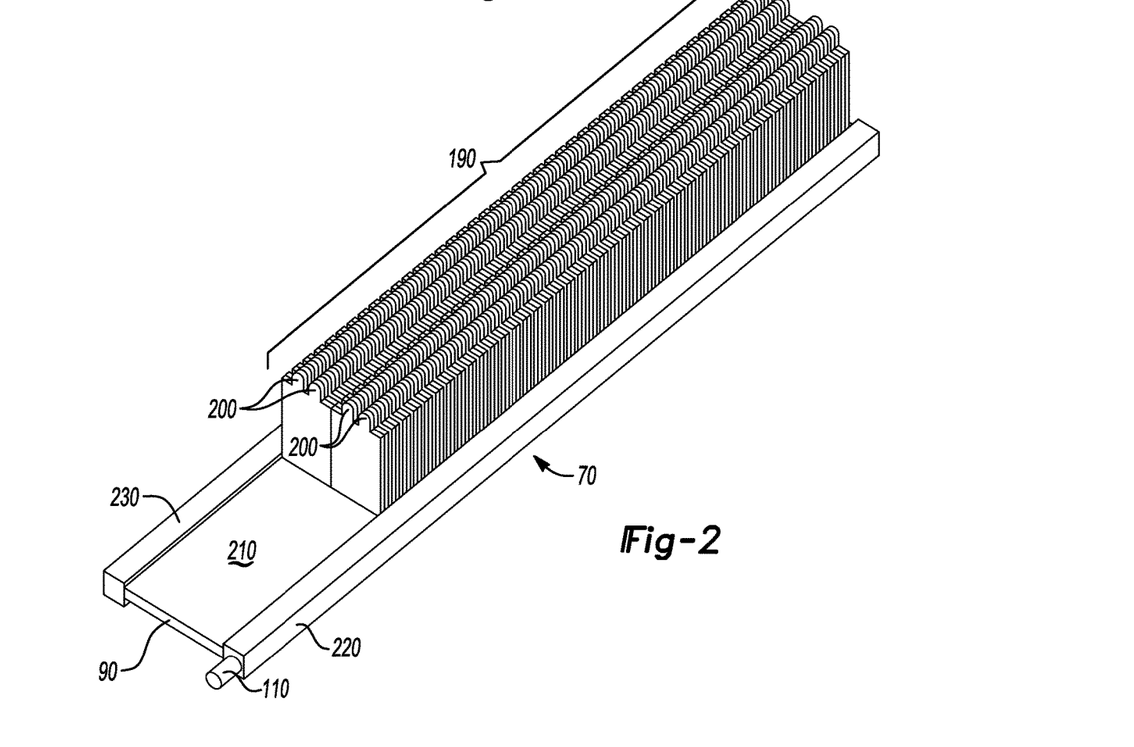
FIG. 2 is a perspective view of the vehicle battery pack with cooling system of FIG. 1.
Figure 3:
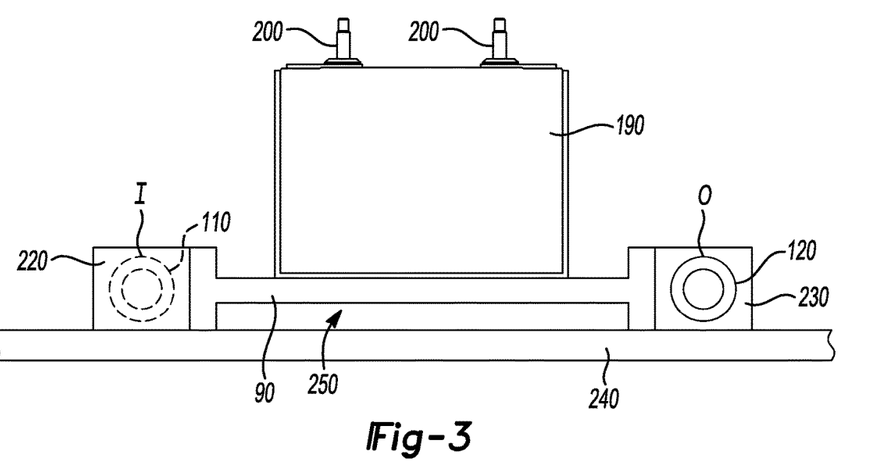
FIG. 3 is a side view of the vehicle battery pack and cooling system of FIG. 1.

With reference now to FIGS. 2-3, there is shown therein a series of battery cells stacked atop the cooling system 70 of FIG. 1 in a perspective view. As shown, the batteries 190 and cooling system 70 are partially assembled. Battery cell terminals 200 are connected to a bus (not shown) within the battery pack or battery module. A top surface of the cooling plate 210 is adjacent the battery cells. Surface is composed of an electrically insulated material. Cooling plate 90 is attached to an inlet manifold 220 at one end and the outlet manifold 230 at another end. An orifice is formed in the manifold 220 for the inlet nozzle 110 configured to interconnect the manifold 220 and a fluid line (e.g., 140 as shown in FIG. 1). Referring now to FIG. 3 as side view of the assembly of FIG. 2 is shown. The cooling plate 90 is shown sitting on top of a vehicle surface 240 (e.g., a floor pan). Inlet nozzle 110 is shown in phantom attached to the inlet manifold 220. Outlet nozzle 120 is shown attached to the outlet manifold 230. The cooling plate 90 is configured to be mounted between the inlet and outlet manifold 220, 230, respectively so as to define a gap or space 250 between the plate 90 and the vehicle surface 240.

Figure 4:
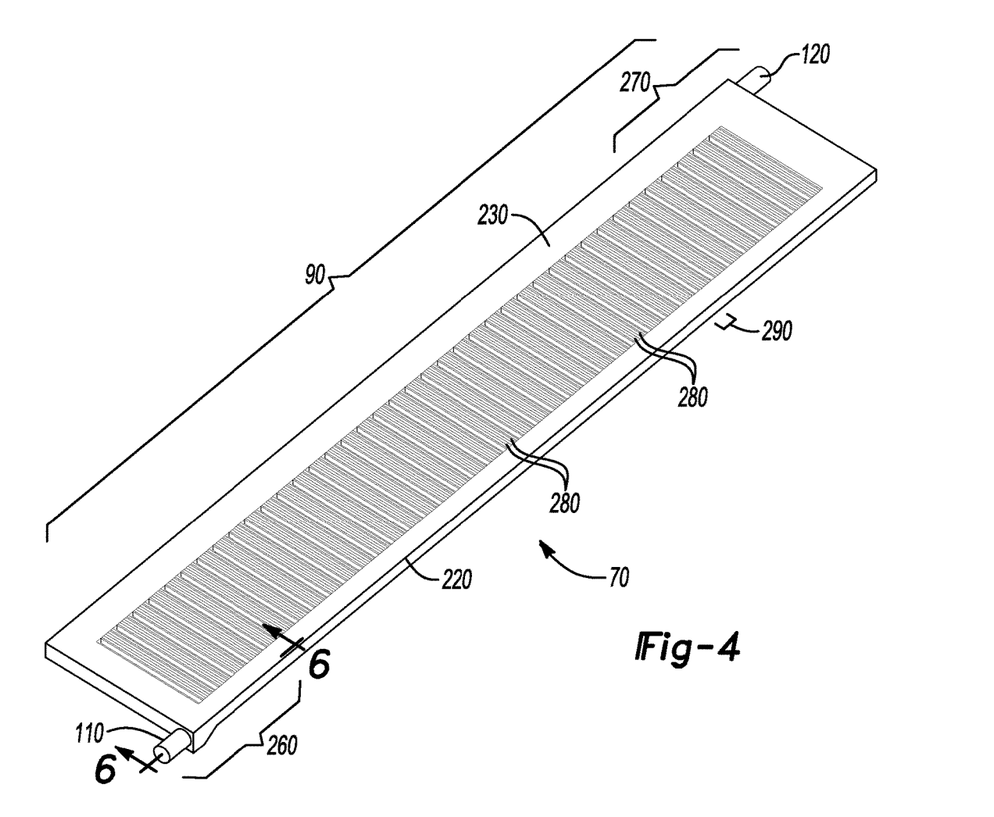
FIG. 4 is a perspective view of the cooling system of FIG. 1.

A cross-sectional perspective view of the cooling plate 90 is shown in FIG. 4. As shown, the cooling plate 90 is connected to the inlet manifold 220 and the outlet manifold 230. Inlet coolant temperatures can be at or above ambient temperatures. An inlet 260 includes the inlet nozzle 110 and a section of the inlet manifold 220. An outlet 270 also includes the outlet nozzle 120 and a section of the outlet manifold 230. Cooling plate 90 is formed with a plurality of micro-conduits 280 that extend between the inlet manifold 220 and outlet manifold 230. Micro-conduits 280 are in fluid communication with each manifold 220, 230. The term "micro" is used for conduits that are relatively tiny in size as compared to the body with which they occupy, which in this case is the cooling plate 90. In the illustrated embodiment, the micro-conduits 280 are grooves sectioned off with respect to the cooling plate 90. Each section 290 includes four grooves extending between the manifolds 220, 230. Grooves 280 are interconnected in that at least some of the fluid within a groove of the same section can pass through a different groove.

Figure 5:
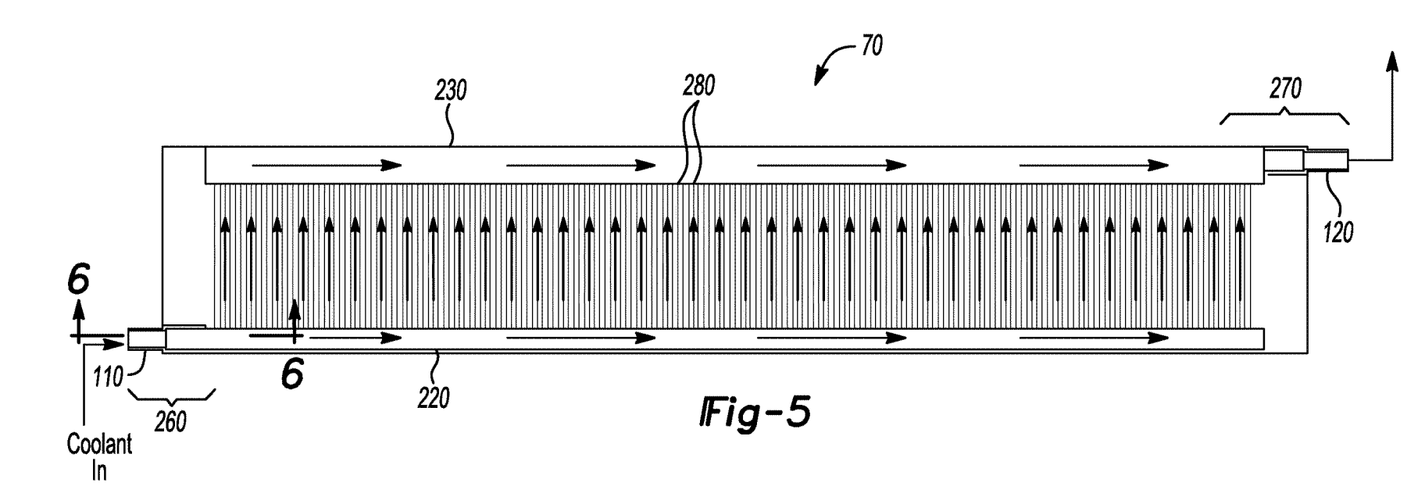
FIG. 5 is a top cross-sectional view of the cooling system of FIG. 1, with fluid path shown therein.

The cooling system 70 is designed to produce a flow pattern as shown in FIG. 5. Coolant enters the inlet nozzle 110. Coolant then travels through the inlet manifold 220 and into the micro-conduits 280. Fluid is passed through the micro-conduits, into the outlet manifold 230 and through the outlet nozzle 120 as shown.

Figure 6:
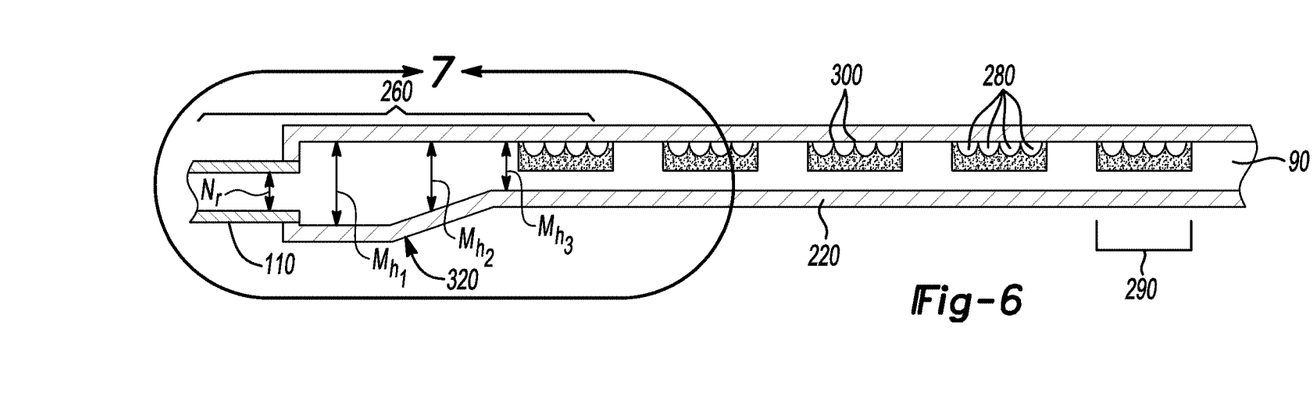
FIG. 6 is a cross-sectional view of cooling system of FIG. 4, taken along line 6-6.

The inlet manifold 220 and micro-conduits 280 are now discussed with reference to FIGS. 6 and 7. FIG. 6 is a partial cross-sectional view along line 6-6 of FIG. 4. Five sections 290 of the cooling plate 90 are also shown in FIG. 6. As shown, in FIG. 7 each section includes four grooves 280. Between grooves 280 are fins 300 or profile peaks. Three fins 300 are positioned or incorporated between the grooves 280. Convective heat transfer occurs from battery to liquid through fin surface and the walls 310 of micro channels 280 (as shown in FIG. 7).

Figure 7:
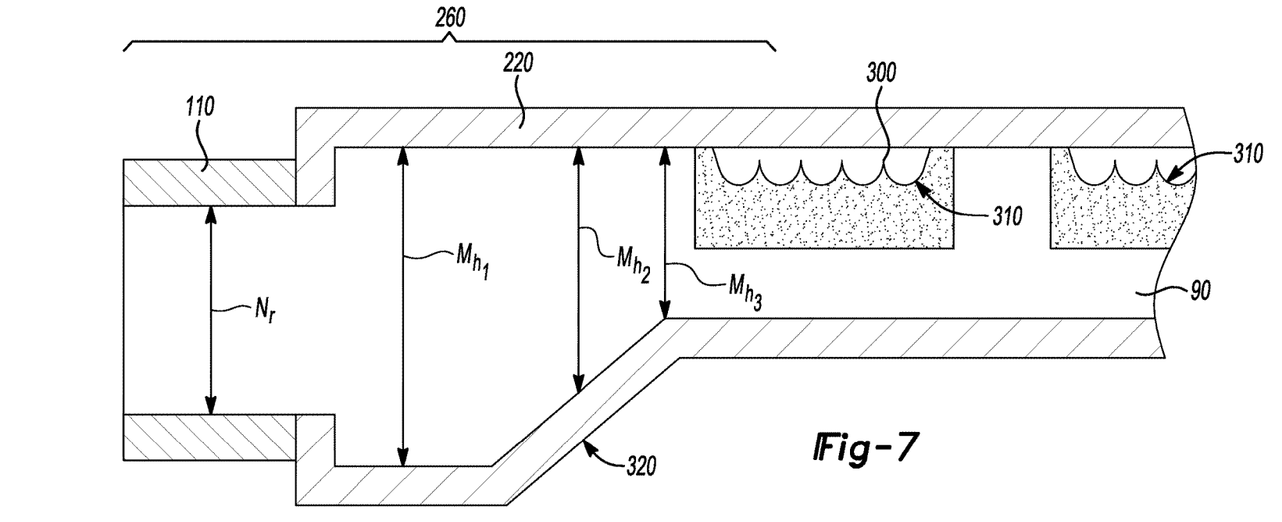
FIG. 7 is a cross-sectional view of the cooling system of FIG. 6, taken along circle 7.

As shown in FIGS. 6 and 7 the inlet manifold 220 includes a ramped surface 320 formed therein. Inlet 260 is formed with a varying cross-sectional area. At the nozzle 110 the inlet 260 has a cross-sectional area defined by the radius of the inlet nozzle, $N_r$, as shown. In the first portion of the inlet manifold, the inlet 260 has a cross-sectional area defined by the width of the inlet manifold, which is constant, and the height of the manifold. In a first portion of the inlet 260 $M_{h1}$ is the height of the manifold. In this embodiment, $M_{h1}$ is larger than $N_r$. The cross-sectional area in the manifold is defined by the position of an upper surface of the manifold with respect to a lower surface of the manifold. Lower surface is sloped at ramped surface 320 and accordingly the cross-sectional area of the inlet 260 changes—decreasing further away from the inlet nozzle 110. Thus $M_{h3}$ is smaller than $M_{h2}$ which is also smaller than $M_{h1}$. The outlet 270 of FIG. 4 is of similar construction to inlet 260 as shown in FIG. 7. Outlet manifold 230 (shown in FIG. 4) is configured with a ramped surface. The cross-sectional area of the outlet 270 increases going from the manifold 230 to the outlet nozzle 120.

Figure 8:
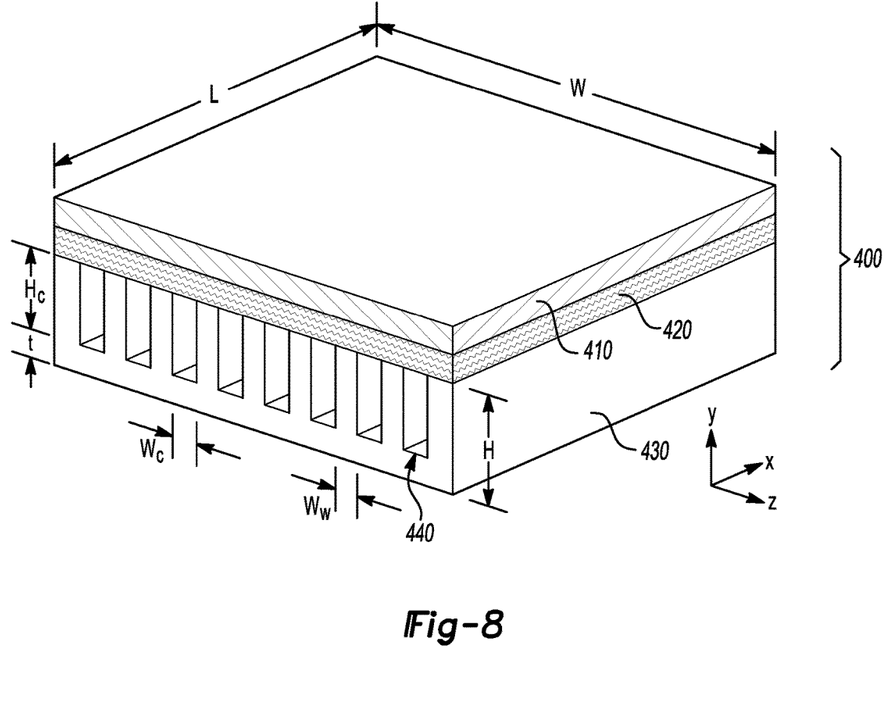
FIG. 8 is a model of a section of a cooling system with micro-conduits.

Micro-conduits can be configured to have varying dimensions. With reference now to FIG. 8 a method of manufacturing a cooling system for a vehicle battery includes optimization techniques for micro-conduit geometry. A cross-section of an exemplary cooling plate 400 is shown. Cooling plate 400 is composed of three different materials. A top layer 410 is composed of a di-electric material that is thermally conductive. Layer 410 is composed of an electrically non-conductive material. Layer 420 is composed of a metallic material (e.g., aluminum). Micro-conduits are formed in the bottom layer 430.

Shown below is Table 1 showing cooling system performance based on micro-conduit geometry for several case studies, assuming an inlet manifold and outlet manifold of similar construction as discussed with respect to FIGS. 1-7. Various dimensions were adjusted between tests. Some dimensions were held constant. Table 1 below corresponds to FIG. 8 which denotes the dimensions of the cooling plate 400 and micro-conduits 440. The width of the conduit 440, is denoted by Wc. Ww is the material between the micro-conduits. The thickness of the plate below the bottom of the micro-conduit is denoted by t. The overall length of each micro-conduit is denoted by L and the width of the cooling plate is demoted by W. The overall height of the plate is denoted by H. The height of each micro-conduit is indicated by Hc.

As shown below sample cases were performed with varied micro-conduit width, Wc, and number of micro-conduit channels. Other parameters listed or unlisted can also be adjusted to optimize cooling plate performance. A cooling plate designed to optimize the reduction in coolant outlet temperature would have one micro-conduit with a width of 400 mm. In order to optimize heat rejection a cooling plate formed with characteristics of case 7 was implemented. The cooling plate had 30 total channels formed therein and each channel is approximately 7.1 mm wide. In order to maximize pressure drop from the inlet to the outlet of the cooling plate Case 7 geometry was also used. In this way, cooling plate geometry can be tailored to suit performance targets based on empirical data or regression analysis. Performance targets can include drops in coolant temperature, pressure drops in coolant, heat rejection and other factors that support cooling.

TABLE 1

Cooling Performance Based on Micro-Conduit Geometry

| Geometric Parameters | Case 1 | Case 2 | Case 3 | Case 4 | Case 5 | Case 6 | Case 7 |
|---|---|---|---|---|---|---|---|
| Width of the conduit (mm), Wc | 400 | 68 | 33 | 20 | 13.7 | 9.7 | 7.1 |
| Number of conduits total, c | 1 | 5 | 10 | 15 | 20 | 25 | 30 |
| Coolant outlet temperature (Celsius) | 30.64 | 30.75 | 30.875 | 30.95 | 31.05 | 31.14 | 31.2 |
| Heat rejection capability (Watts) | 292 | 443 | 516 | 565 | 620 | 677 | 743 |
| Pressure drop approx. (kpa) | 0.03 | 0.091 | 0.409 | 1.125 | 2.457 | 4.99 | 9.872 |

A method of manufacturing a cooling system for a vehicle battery includes the optimization techniques discussed. The method includes the steps of: forming a cooling plate (e.g., 90 as shown in FIG. 4); attaching an inlet manifold to the cooling plate (e.g., 220 as shown in FIG. 4); attaching an outlet manifold to the cooling plate (e.g., 230 as shown in FIG. 4); forming a plurality of micro-conduits configured to deliver fluid between the inlet manifold and outlet manifold in the cooling plate (e.g., 280 as shown in FIG. 4); and tailoring a geometry of the micro-conduits according to a performance target. As discussed, tailoring the geometry of the micro-conduits includes setting any one of the aforementioned dimensions for the micro-conduits according to a performance target. The method can include, for example, identifying a performance target for the cooling system (e.g., a heat rejection greater than or equal to 620 watts). A mathematical model, such as the empirical table shown above, is cross-referenced to determine the geometry of the micro-conduits. Using the control characteristics of Table 1, a cooling plate having at least 20 micro-conduits formed therein with a standard width of 13.7 mm can be formed to reach the target heat rejection.

Figure 9:
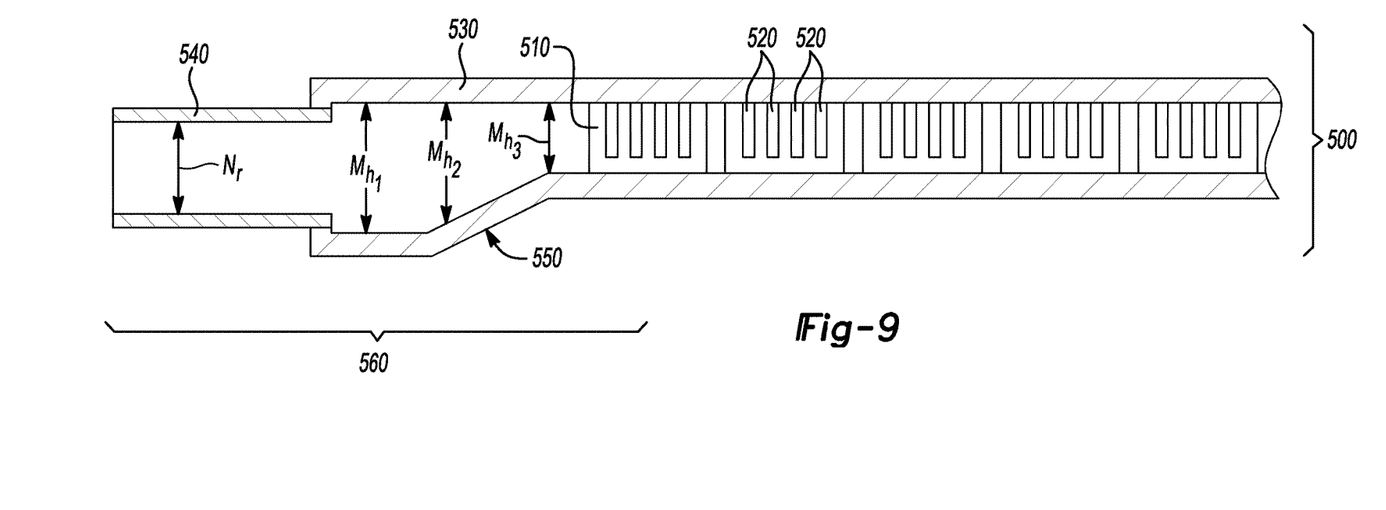
FIG. 9 is a side cross-sectional view of another exemplary cooling system.

Now with reference to FIG. 9, there is shown therein a cross-section of another exemplary cooling system 500. The cooling system 500 includes a cooling plate 510 with micro-conduits 520 formed therein. Micro-conduits 520 are of a different size and configuration than, for example, the micro-conduits 280 of FIGS. 6-7. Several sections of the cooling plate 510 are shown in FIG. 9. As shown, each section includes four rectangular micro-channels 520 formed in a mid-section of the cooling plate 510. Each micro-channel 520 is isolated from adjacent channels and are not fluidly connected.

In other embodiments, micro-conduits 520 are of different sizes and shapes. For example, in one embodiment the base of the micro-conduit is angularly disposed so as to form a triangular profile or valley in the base of the conduit. A circular base is formed in another embodiment. In another exemplary embodiment, the micro-conduits are also rectangular channels but are formed at a shallower depth than shown in FIG. 9.

Fluid enters the cooling plate through an inlet manifold 530. A cross-section of the inlet manifold 530 is partially shown in FIG. 9. As shown, the inlet manifold 530 includes an inlet nozzle 540 and a ramped surface 550 formed therein. Inlet 560 is formed with a varying cross-sectional area. At the nozzle 540 the inlet 560 has a cross-sectional area defined by the radius of the inlet nozzle, $N_r$, as shown. In the first portion of the inlet manifold 530, the inlet 560 has a cross-sectional area defined by the width of the inlet manifold which is constant and the height of the manifold, which varies. In a first portion of the inlet section, $M_{h1}$, is the height of the manifold (as measured from the upper and lower portions of the manifold. In this embodiment, $M_{h1}$ is larger than $N_r$. The lower surface is sloped and accordingly the cross-sectional area of the inlet 560 changes—decreasing further away from the inlet. Thus $M_{h3}$ is smaller than $M_{h2}$ which is also smaller than $M_{h1}$.

Figure 10:
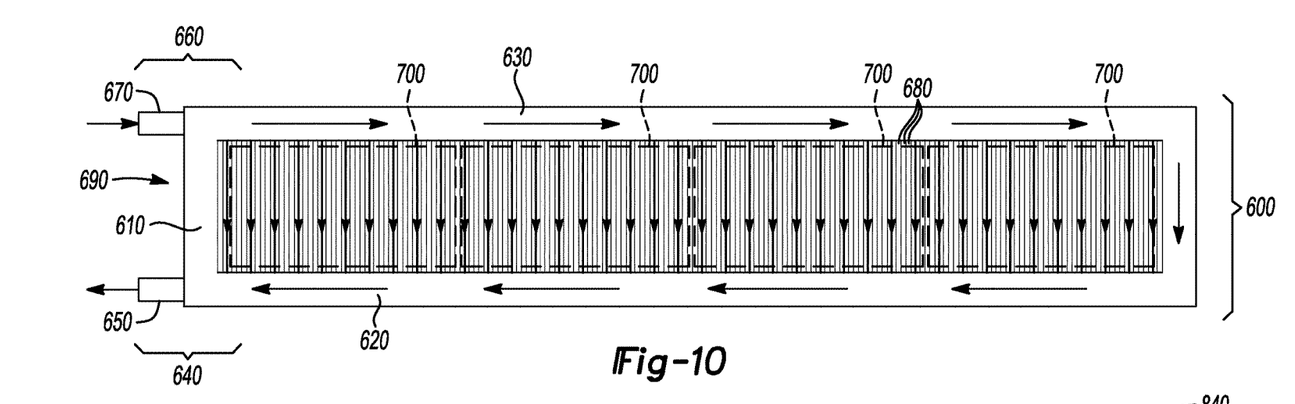
FIG. 10 is a top cross-sectional view of another exemplary cooling system.

Now with reference to FIG. 10, there is shown therein another exemplary cooling system 600 for a vehicle battery assembly. The cooling system 600 includes a cooling plate 610 attached to an outlet manifold 620 and inlet manifold 630. A cross-sectional top view of the cooling plate 610 is shown in FIG. 10. An inlet 660 includes an inlet nozzle 670 attached to the inlet manifold 630. An outlet 640 includes an outlet nozzle 650 also shown attached to the outlet manifold 620. Cooling plate 610 is formed with micro-conduits 680 extending between the inlet manifold and outlet manifold, 630 and 620, respectively. Micro-conduits 680 are in fluid communication with each manifold. The cooling system 600, of FIG. 10, is designed to produce a unique flow pattern. In this embodiment, the inlet 660 and outlet 640 are positioned at a common end 690 of the cooling system. Thereby coolant circulates at varying distances (e.g., a shorter route through micro-conduits proximate end 690 of the cooling plate 610 and a longer distance through micro-conduits distant end 690). In this embodiment, inlet 660 and outlet 640 are positioned at end 690.

Cooling system 600, as shown in FIG. 10, is compatible with a battery pack for a vehicle. Battery pack is composed of a series of modules 700. In this arrangement, modules 700 can be stacked atop cooling system as shown in phantom. Thermal energy is removed from the adjacent surface of battery modules 700 during operation of the cooling system.

Figure 11:
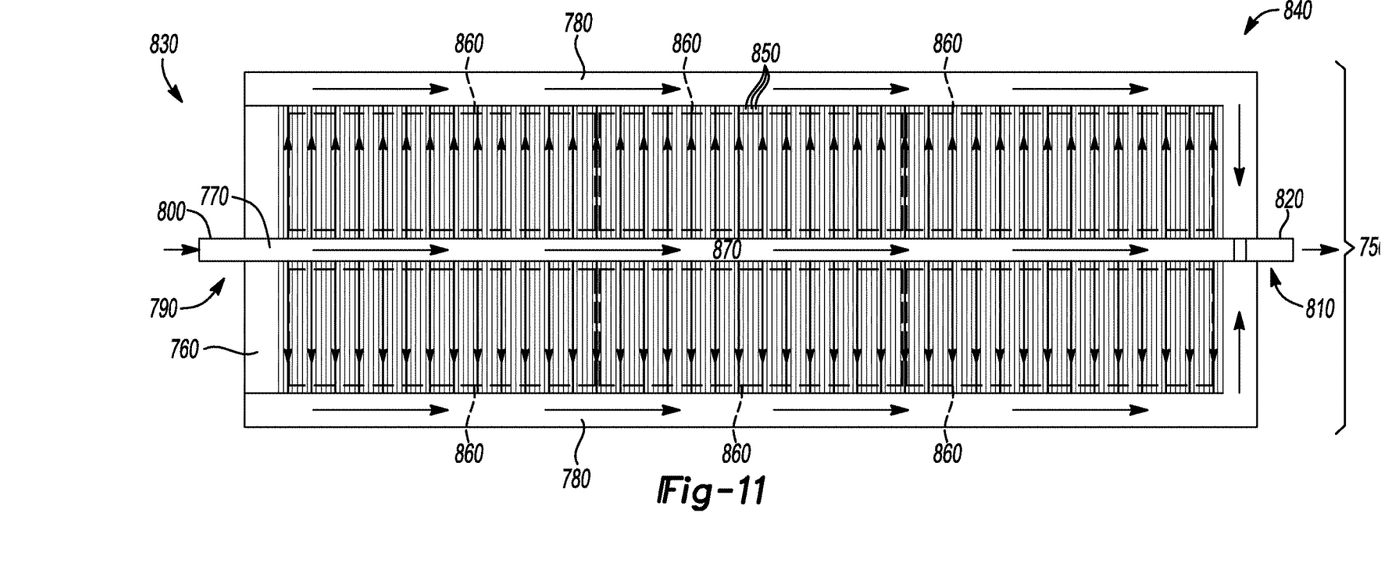
FIG. 11 is a top cross-sectional view of another exemplary cooling system.

Now with reference to FIG. 11, there is another exemplary cooling system 750 for a vehicle battery assembly shown therein. The cooling system 750 includes a cooling plate 760 attached to an inlet manifold 770 and outlet manifold 780. A cross-sectional top view of the cooling plate 760 is shown in FIG. 11. An inlet 790 includes an inlet nozzle 800 attached to the inlet manifold 770. An outlet 810 includes an outlet nozzle 820 also shown attached to the outlet manifold 780. The inlet and outlet 790 and 810, respectively are positioned collinearly with respect to the cooling plate 760. Inlet 790 is positioned at end 830 of the cooling plate 760; outlet is positioned at end 840 of the cooling plate. Inlet manifold 770 extends through a center section of the cooling plate 760. Outlet manifold 780 extends around two sides of the periphery of the cooling plate 760. Cooling plate 760 is formed with micro-conduits 850 extending between the inlet manifold 770 and outlet manifold 780. Micro-conduits 850 are in fluid communication with each manifold. The flow pattern produced by the cooling system, of FIG. 11, is shown. In this embodiment, a central coolant line is provided with the inlet manifold 770 positioned in the middle of the cooling plate 760. Coolant enters an inlet nozzle 800 and exits the outlet manifold at outlet nozzle 820. Coolant circulates at varying distances (e.g., a shorter route directly from inlet 790 to outlet 810 and a longer distance through micro-conduits 850 at the outlet manifold 780, then through outlet 810).

Several battery modules 860 are positionable atop the cooling system 750 as shown in FIG. 11. Thermal energy is removed from the adjacent surface of battery modules during operation of the cooling system. A first series of battery modules 750 are set on one side of inlet manifold 770. A second series of battery modules are set on a different side of inlet manifold 770. In this way, a ventilation passage 870 is defined between the first series and battery modules and the second series of battery modules. Ventilation passage 870 provides additional thermal removal in the center section of the battery pack with this cooling system 750. Moreover, ventilation passage 870 places greater distance between battery modules 860 allowing for ventilation therebetween.

Figure 12:
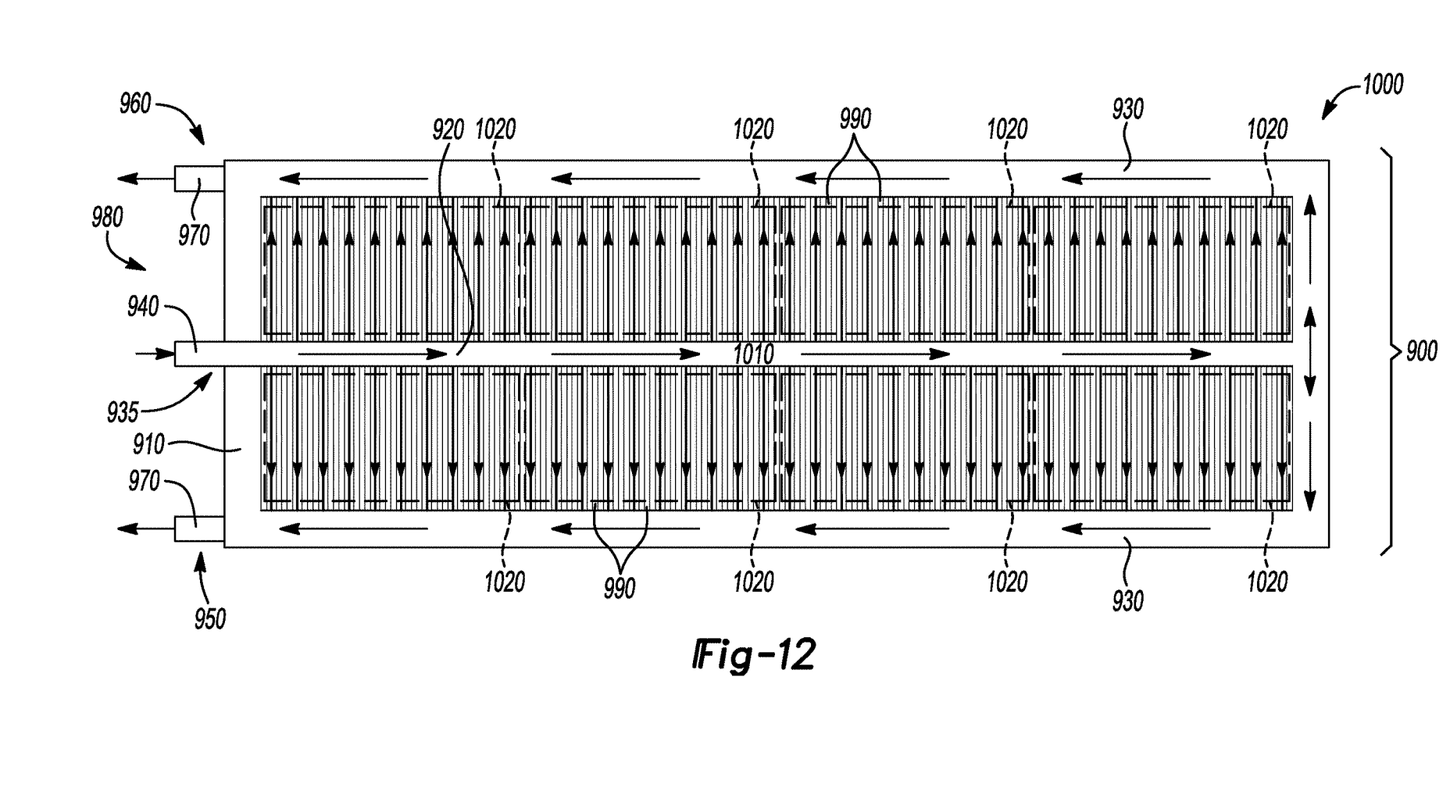
FIG. 12 is a top cross-sectional view of another exemplary cooling system.

Reference now to FIG. 12, there is another exemplary cooling system 900 for a vehicle battery assembly shown therein. The cooling system 900 includes a cooling plate 910 attached to an inlet manifold 920 and outlet manifold 930. A cross-sectional top view of the cooling plate 910 is shown in FIG. 12. An inlet 935 includes an inlet nozzle 940 attached to the inlet manifold 920. Two outlets 950, 960 are included in this embodiment. Each outlet 950, 960 includes an outlet nozzle 970 also shown attached to a section of the outlet manifold 930. Inlet 935 and outlets 950, 960 are positioned at end 980 of the cooling plate 910. Inlet manifold 920 extends through a center section of the cooling plate 910. Outlet manifold 930 extends around three sides of the periphery of the cooling plate 910.

Cooling plate 910, of FIG. 12, is formed with micro-conduits 990 extending between the inlet manifold 920 and outlet manifold 930. Micro-conduits 990 are in fluid communication with each manifold 920, 930. The flow pattern produced by the cooling system 900, of FIG. 12, is shown. In this embodiment, a central coolant line is provided with the inlet manifold 920 positioned in the middle of the cooling plate 910. Coolant enters an inlet nozzle 940 and exits the outlet manifold 930 either at outlet nozzle 970. Coolant circulates at varying distances (e.g., a shorter route directly from inlet 935 to outlet 950 or 960 and a longer distance through micro-conduits at the end of the cooling plate distant from the inlet and outlet, end 1000). In this manner, a ventilation passage 1010 is defined between battery modules 1020 positioned on top of the cooling system 900. A first series of battery modules are set on one side of inlet manifold 920. A second series of battery modules are set on a different side of inlet manifold. Ventilation passage 1010 is formed therebetween.

Figure 13:
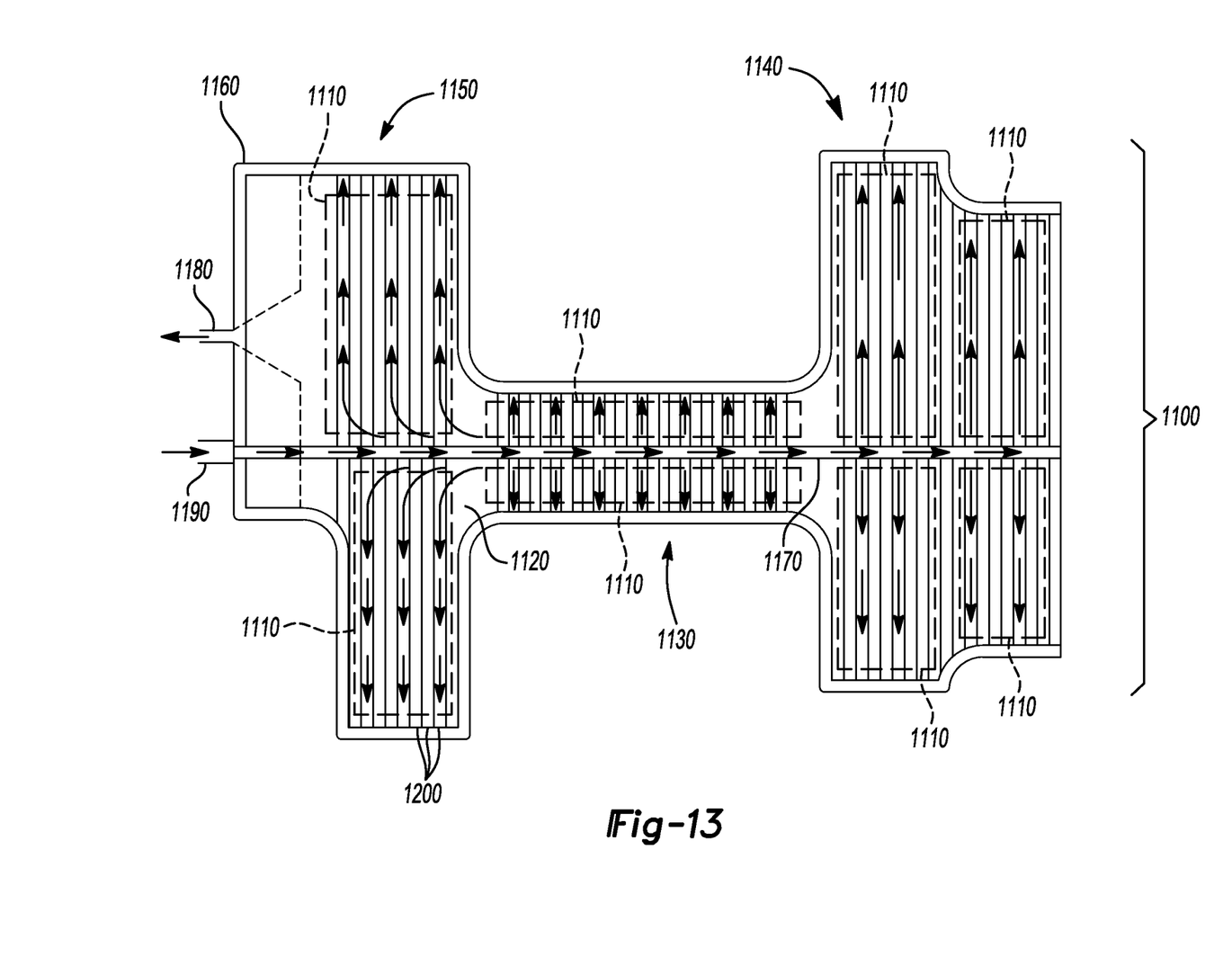
FIG. 13 is a top cross-sectional view of another exemplary cooling system.

Reference now to FIG. 13, there is another exemplary cooling system 1100 for a vehicle battery assembly shown therein. The cooling system 1100 is segmented into three sections that support multiple vehicle battery packs (or modules) 1110 positioned in different areas of the vehicle. The cooling system 1100 includes a cooling plate 1120 with a narrow section 1130 and two larger perpendicularly positioned sections 1140 and 1150. Cooling plate 1120 is attached to an inlet manifold 1160 and outlet manifold 1170. A cross-sectional top view of the cooling plate 1120 is shown in FIG. 13. An inlet 1190 with nozzle attached to the inlet manifold 1170. An outlet 1180 with nozzle is also shown attached to a section of the outlet manifold 1160. Inlet manifold 1170 extends through a center section of the cooling plate 1120. Outlet manifold 1160 extends around the periphery of the cooling plate.

Cooling plate 1120, of FIG. 13, is formed with micro-conduits 1200. Micro-conduits 1200 are in fluid communication with each manifold 1160, 1170. The flow pattern produced by the cooling system, of FIG. 13, is shown. In this embodiment, a central coolant line is provided with the inlet manifold 1170 positioned in the middle of the cooling plate 1120. Coolant enters an inlet 1190 and exits the outlet manifold at outlet 1180. Eight sets of battery modules 1110 can be positioned with respect to the cooling plate 1120.

Figure 14:
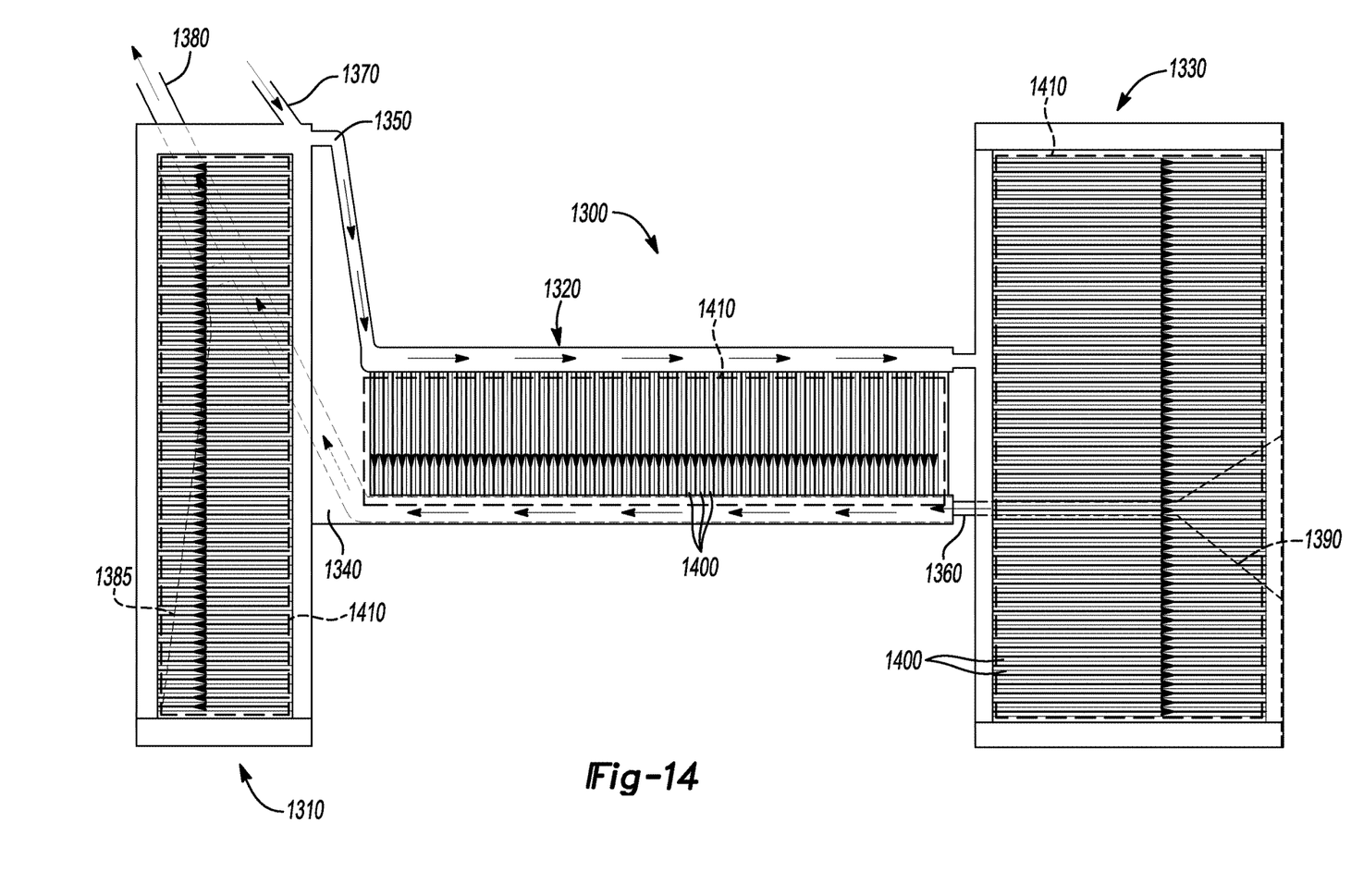
FIG. 14 is a top cross-sectional view of another exemplary cooling system.

Referring now to FIG. 14, there is another exemplary cooling system 1300 for a vehicle battery assembly shown therein. The cooling system 1300 is segmented into three sections 1310, 1320 and 1330 that support multiple vehicle battery packs (or modules) positioned in different areas of the vehicle. The cooling system 1300 includes a cooling plate 1340 with one section 1320 positioned perpendicularly with respect to two other sections, 1310 and 1330. Cooling plate 1340 is attached to an inlet manifold 1350 and outlet manifold 1360. Cooling plate 1310 is attached to a drain 1385 that is connected to outlet manifold 1360. A cross-sectional top view of the cooling plate 1340 is shown in FIG. 14. An inlet nozzle 1370 is attached to the inlet manifold 1350. An outlet nozzle 1380 is also shown attached to a section of the outlet manifold 1360. Outlet manifold extends down drain 1390, in connection with drain 1385 and underneath cooling plate 1340.

Cooling plate 1340, of FIG. 14, is also formed with micro-conduits 1400. Micro-conduits 1400 are in fluid communication with each manifold 1350, 1360. The flow pattern produced by the cooling system, of FIG. 14, is shown. At least three sets of battery modules 1410 can be positioned with respect to the cooling plate.

Micro conduits can be formed using a number of different manufacturing techniques including but not limited to laser cutting, water cutting, extrusion, injection molding, milling or other forming techniques. It will also be appreciated that different types of fluid or coolant can be used with the various cooling systems discussed and considered by the present disclosure. For example, water can be used, a water glycol mixture, coolant, refrigerant, oil, air or other types of fluid can be utilized.

While the best modes for carrying out the invention have been described in detail, those familiar with the art to which this invention relates will recognize various alternative designs and embodiments for practicing the invention within the scope of the appended claims.

I claim:

1. A cooling system for a vehicle battery, comprising:
   a cooling plate;
   an inlet manifold configured to supply fluid from a heat exchanger to the cooling plate;
   an outlet manifold configured to return fluid to the heat exchanger; and
   a plurality of micro-conduits formed in the cooling plate, configured to deliver fluid between the inlet manifold and outlet manifold, wherein one of the inlet manifold or outlet manifold is positioned between a first and second set of micro-conduits formed in the cooling plate.

2. The cooling system of claim 1, further comprising:
   an inlet at an end of the inlet manifold; and
   an outlet at an end of the outlet manifold.

3. The cooling system of claim 2, wherein the inlet has a varying cross-sectional area.

4. The cooling system of claim 2, wherein the inlet and outlet are positioned at a common end of the cooling system.

5. The cooling system of claim 2, wherein the inlet and outlet are positioned collinearly with respect to the cooling plate.

6. The cooling system of claim 1, wherein the micro-conduits are channels.

7. The cooling system of claim 1, wherein the micro-conduits are grooves.

8. The cooling system of claim 7, wherein at least some of the micro-conduits in the plurality of micro-conduits are interconnected.

9. The cooling system of claim 8, further comprising:
   fins incorporated between interconnected micro-conduits.

10. A vehicle battery package, comprising:
    a plurality of battery cells;
    a cooling plate adjacent the battery cells;
    an inlet manifold or outlet manifold configured to extend along a center section of the cooling plate; and
    a plurality of micro-conduits formed in the cooling plate, configured to deliver fluid between the inlet manifold and outlet manifold, wherein the battery cells are positioned on each side of the inlet or outlet manifold.

11. A vehicle battery package, comprising:
    a plurality of battery cells;
    a cooling plate adjacent the battery cells;
    an inlet manifold or outlet manifold configured to extend along a center section of the cooling plate;
    a plurality of micro-conduits formed in the cooling plate, configured to deliver fluid between the inlet manifold and outlet manifold; and
    an inlet at the end of the inlet manifold, wherein the inlet has a varying cross-sectional area.

12. The vehicle battery pack of claim 11, further comprising:
    an outlet at an end of the outlet manifold, wherein the outlet has a varying cross-sectional area.

13. The vehicle battery pack of claim 12, wherein the inlet and outlet are positioned at a common end of the cooling system.

14. The vehicle battery pack of claim 10, wherein the micro-conduits are channels.

15. The vehicle battery pack of claim 10, wherein the micro-conduits are grooves.

16. The vehicle battery pack of claim 15, further comprising:
    fins incorporated between interconnected grooves.

17. The cooling system of claim 3, wherein the inlet extends from the inlet manifold along an axis, the inlet at a first axial distance from the inlet manifold having a first cross-sectional diameter, the inlet at a second axial distance from the inlet manifold having a second cross-sectional diameter that is greater than the first cross-sectional diameter, the second axial distance greater than the first axial distance.

18. The cooling system of claim 8, wherein at least some of the micro-conduits are interconnected such that some of the fluid within one of the micro-conduits can pass through another one of the microconduits.

* * * * *